United States Patent Office 3,008,535
Patented Nov. 14, 1961

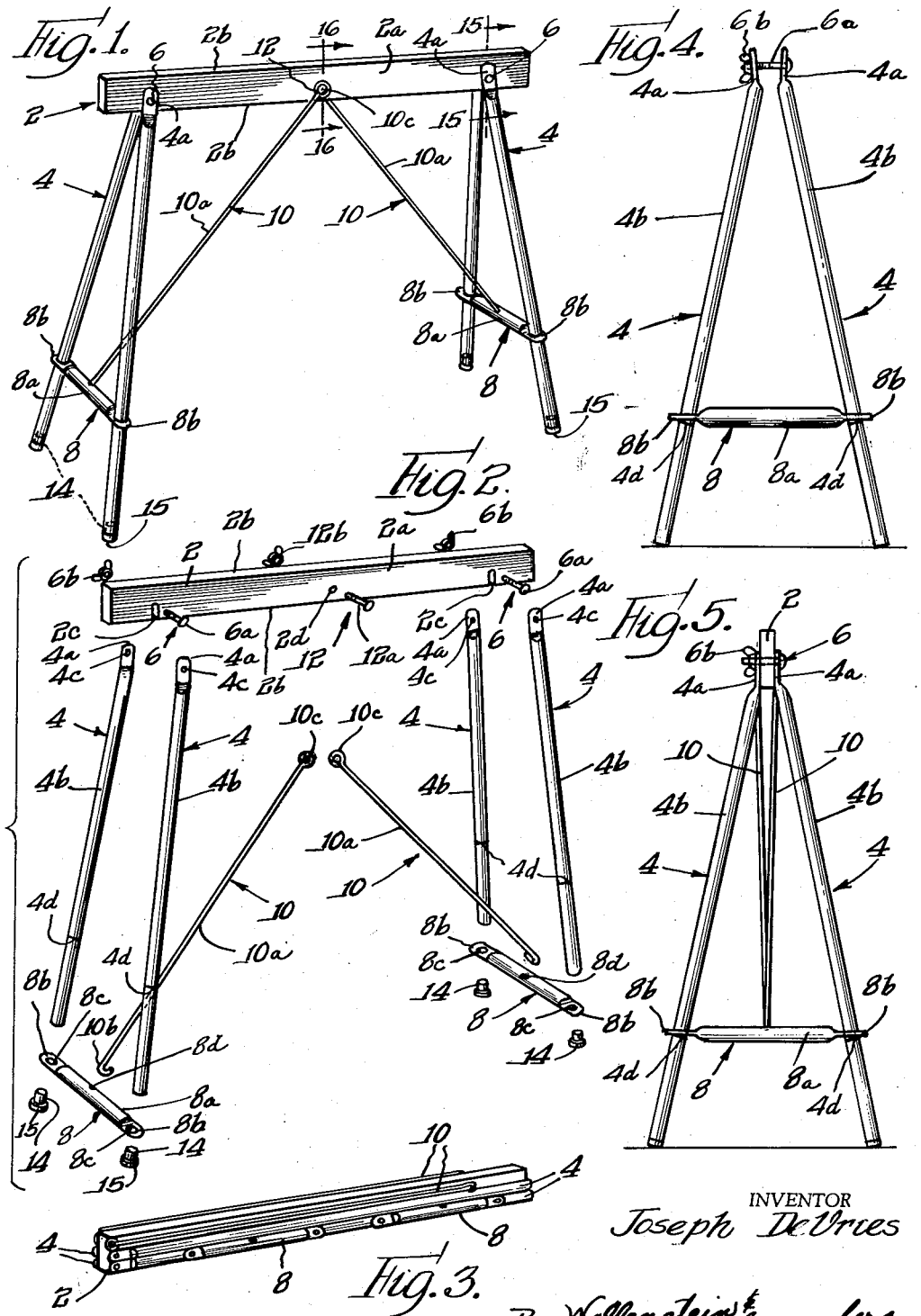

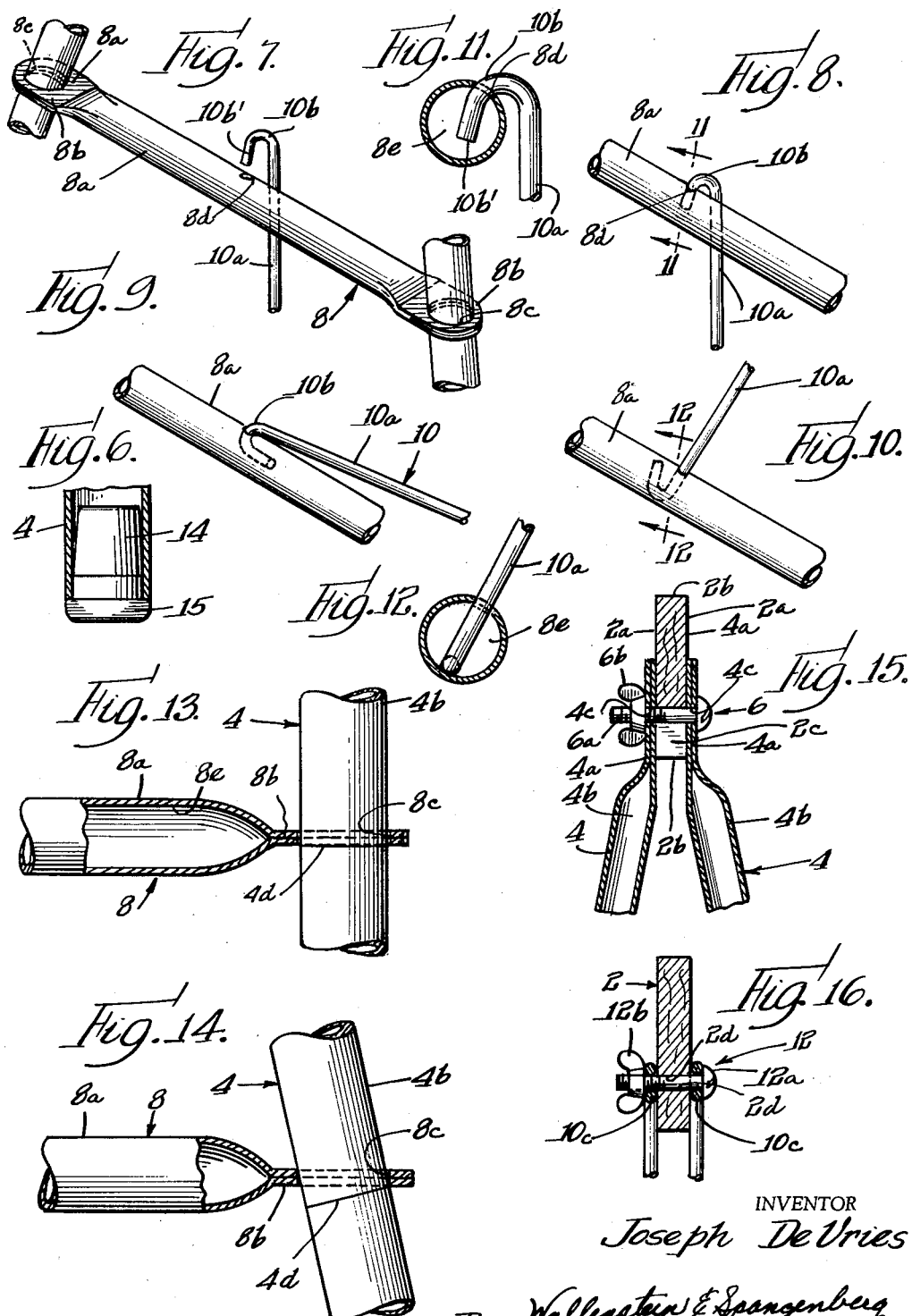

3,008,535
SAWHORSE ASSEMBLY
Joseph De Vries, 6855 Thorndale, Chicago, Ill.
Filed Aug. 18, 1958, Ser. No. 755,850
4 Claims. (Cl. 182—181)

The present invention relates to the construction of saw horses, which are racks for supporting wood and other materials for sawing by hand.

One of the objects of the present invention is to provide a compact assembly of elements which can be quickly and easily assembled into a sturdy saw horse. A related object of the present invention is to provide a saw horse which is so constructed that it can be quickly and easily disassembled for storage or for transportation to other locations where the saw horse may be readily assembled for further use.

Still another one of the objects of the present invention is to provide an assembly of elements which may be assembled quickly and easily into a sturdy saw horse, and wherein many of the parts thereof are securely lockable together without the need of separate fastening elements, such as bolts and the like. A related object of the invention is to provide an assembly of elements for constructing a saw horse wherein those fastener elements which are used are of a type which can be secured in place without the use of any tools.

A further object of the present invention is to provide an assembly of elements for making a saw horse as above described, wherein the parts are constructed from tubular metal stock, wire rods and rectangular wood or metal stock.

An all encompassing object of the present invention is to provide an assembly of components for making a saw horse as above described which is relatively inexpensive to manufacture.

Other objects of the invention will become apparent upon making reference to the specification to follow and the drawings which, respectively, describe and illustrate the preferred embodiment of the present invention. In the drawings:

FIG. 1 is a perspective view of a saw horse constructed in accordance with the present invention;

FIG. 2 is an exploded view showing the parts making up the saw horse of FIG. 1;

FIG. 3 is a perspective view showing the parts shown in FIG. 2 arranged in compact form for packaging;

FIG. 4 is an end view showing one of the leg assemblies of the saw horse in a condition to be secured to the crossbar thereof;

FIG. 5 is an end view of the assembled saw horse of FIG. 1;

FIG. 6 is an enlarged fragmentary sectional view through the bottom of one of the leg elements making up the leg assembly of FIG. 4;

FIGS. 7 through 10 show a sequence of views illustrating the manner in which a tie rod is secured to a leg-connecting crosspiece forming part of the leg assembly of FIG. 4;

FIG. 11 is an enlarged sectional view through the leg-connecting crosspiece when the hooked end of the tie rod is first inserted into an opening in the leg-connecting crosspiece, as seen along the section 11—11 in FIG. 8;

FIG. 12 is an enlarged sectional view through the leg-connecting crosspiece, showing the tie rod in its final position, as seen along section line 12—12 in FIG. 10;

FIG. 13 is an enlarged sectional view through the end of a leg-connecting crosspiece, showing the position of a leg element in a leg-receiving hole when the crosspiece is first slid in position on the leg element;

FIG. 14 shows a sectional view of the leg-connecting crosspiece shown in FIG. 13, with the leg element in its final inclined position where the leg-connecting crosspiece is locked in position around the leg element;

FIG. 15 is a sectional view through the crossbar, taken along section line 15—15 in FIG. 1, and shows the manner in which the leg elements are secured thereto; and FIG. 16 is a sectional view through the crossbar, taken along section line 16—16 in FIG. 1, and shows the manner in which the tie rods are secured to the crossbar.

Referring now to FIG. 1 showing the completely assembled saw horse of the present invention, the main parts of the saw horse comprise a rectangular crossbar 2 elevated above the ground level by respective pairs of leg elements 4—4 removably secured to opposite ends of the crossbar by fasteners 6—6, leg-connecting crosspieces 8—8 connected between the leg elements of each pair of leg elements to brace the same against relative lateral movement, tie rods 10—10 extending between the leg-connecting crosspieces 8—8 and the center portion of the crossbar 2, and fastener means 12 removably securing the upper ends of the tie rods to the crossbar. The tie rods brace the leg elements against relative longitudinal movement. The various parts making up the saw horse are shown in exploded view in FIG. 2, and, as will appear from the description to follow, are of exceedingly simple and inexpensive construction and are designed to form the extremely compact arrangement shown in FIG. 3. The detailed features of the various elements making up the preferred form of the invention will now be described.

The crossbar 2 may be made of a rectangular piece of wood having straight vertical side surfaces 2a—2a and horizontal upper and lower surfaces 2b—2b. A pair of fastener-receiving holes in the form of slots 2c—2c are cut in the bottom surface 2b of the crossbar near the ends thereof, and a fastener-receiving hole in the form of a circular hole 2d is drilled in the center portion of the crossbar.

The leg elements 4 are all identical parts formed preferably from straight metal tubular stock of circular cross section, most advantageously a light metal such as aluminum. The upper ends of the tubular leg elements are flattened and bent to provide mounting ears 4a extending at an angle to the straight tubular body portions 4b thereof. Each of the mounting ears has a fastener-receiving hole 4c therein. A line 4d is marked on the lower portion of each leg element. The bottom ends of the leg elements are open so to receive tapered caps 14 made of wood or other material which can be inserted into the open bottoms of the leg elements. The caps 14 provide smooth bottom surfaces 15 which can slide along a floor surface without damaging the same.

Each of the leg-connecting crosspieces 8 is preferably made of the same tubular metal stock from which the leg elements are made and has a straight tubular body 8a with flattened ends 8b—8b in which are formed circular leg-receiving openings 8c—8c which are somewhat larger than the outer diameter of the tubular leg elements. The flattened ends 8b—8b of each leg-connecting crosspiece shown in the medial plane of the associated straight tubular body 8a, can be slid over and along the associated leg elements when the latter are substantially parallel to the axes of the leg-receiving openings 8c—8c (FIG. 13). When, however, the leg elements are inclined at an appreciable angle to the axes of the leg-receiving openings 8c—8c, the leg-connecting crosspiece becomes locked in place on the leg elements as the latter binds against the inner, upper and outer, lower, defining wall portions of the leg-receiving holes 8c—8c.

The tubular body 8a of each leg-connecting crosspiece 8 has a centered hook-receiving hole 8d communicating with the cylindrical internal space 8e thereof. The hole 8d is spaced on one side of a line connecting the centers of the leg-receiving holes 8c—8c.

The tie rods 10 which may be made of metal wire stock each comprises a straight shank 10a having a hook 10b formed at one end thereof in a plane including the shank 10a. The hook 10b has an end portion 10b' (FIG. 11) which extends generally longitudinally of the shank 10a but angles slightly outwardly thereof. The width and length of the hook 10b is the same as or slightly smaller than the diameter of the inside space 8e of the associated leg-connecting crosspiece, and the diameter of the wire stock from which each tie rod is made is such that the hook 10b thereof may be freely inserted into the hook-receiving hole 8d of the associated leg-connecting crosspiece. The other end of each tie rod is formed with an eye 10c in a plane including the plane of the shank 10a thereof and at right angles to the plane of the hook 10b thereof.

Fastener means 6 which secure each pair of leg elements to the crossbar comprise a headed bolt 6a, the threaded shank of which passes through one of the fastener-receiving slots 2c in the crossbar 2 and the fastener-receiving holes 4c in the mounting ears of the leg elements, and a wing nut 6b which threads over the end of the bolt shank. Fastener means 12 which connects the tie rods to the crossbar also comprises a headed bolt 12a which passes through the fastener-receiving hole 2d in the crossbar and the eyes 10 in the tie rod and a wing nut 12b.

The first step in assembly of the parts into a saw horse may be the insertion of the open ends of a pair of leg elements into the leg-receiving holes 8c—8c of one of the crosspieces 8 while holding the same parallel to the axes of the holes 8c—8c and with the hook-receiving hole 8d of the crosspiece facing toward the mounting ears 4a—4a of the leg elements. When the flattened ends 8b—8b of the crosspiece containing the holes 8c—8c are opposite the lines 4d—4d marked on the leg elements, the latter are turned in the holes 8c—8c and drawn together so that the mounting ears are parallel. This causes the leg elements to bind in the holes 8c—8c which fixes the position of the crosspiece on the leg elements. A bolt 6a is then passed through the fastener-receiving holes 4c—4c of the leg mounting ears 4a—4a and a wing nut 6b is threaded one or two turns onto the end of the bolt. The above procedure is repeated for the other pair of leg elements. The fastener-receiving slots 2c—2c of the crossbar 2 are then placed respectively over the bolts 6a—6a between the respective pairs of leg mounting ears 4a—4a with the hook-receiving holes 8d—8d of the crosspieces 8—8 facing each other. The wing nuts 6b—6b are then threaded tightly around the bolts 6a—6a to secure the crossbar on the leg elements.

Next, the tie rods are secured between the crossbar 2 and the crosspieces 8—8. To this end, the end 10b' of the hook 10b of one of the tie rods is inserted down into the hook-receiving hole 8d of one of the crosspieces, as shown in FIG. 8. Next, the tie rod is twisted without forcing the same into an inverted position which moves the entire hook into the space 8e inside the tubular body of the crosspiece. The tie rod reaches its limit of movement when the plane of the hook 10b is in a longitudinal plane of the leg-connecting cross-piece. Then, the tie rod extends in an upwardly inclined direction, as shown in FIGS. 10 and 12, with the eye 10c at the other end of the tie rod in a vertical plane. The tie rod in this position has only a small amount of play relative to the leg-connecting crosspiece and remains in the upwardly inclined position unless it is twisted back into its initial position shown in FIG. 8. This procedure is repeated with the other tie rod to attach it to the other crosspiece 8. Next, the eyes 10c—10c at the upper ends of the tie rods are positioned next to the fastener-receiving hole 2d of the crossbar on opposite sides thereof. The bolt 12a is then passed through the aligned tie rod eyes 10c—10c and the fastener-receiving hole 2d of the crossbar 2, and the wing nut 12b is threaded thereover to lock the tie rod securely to the crossbar. The leg elements are then locked into a position where they extend downwardly and outwardly from the crossbar in both lateral and longitudinal directions.

The tapered caps 14 may then be inserted into the open bottoms of the leg elements and held therein in any number of ways. They could be sized to make a press fit within the leg elements or, if they are made of wood, could be sized initially to fit loosely therein when dry and to expand into tight engagement with the walls thereof upon absorption of moisture. The caps can be mounted on the leg elements by turning the saw horse upside down and inserting them into the leg elements.

Much of the strength and stability of the saw horse is imparted by the leg-connecting crosspieces which inhibit lateral movement of the leg elements, to take a major portion of the lateral strain from the fastener means 6—6, and by the tie rods which prevent relative longitudinal movement of the leg elements.

The various elements making up the saw horse are designed for strength, low cost, compactness and ease of assembly.

I claim:

1. In a knockdown assembly, a crossbar, a first and a second pair of leg elements connected to opposite ends of said crossbar for supporting said crossbar in an elevated position, a pair of tubular leg-connecting crosspieces secured between the leg elements of each pair of leg elements for preventing lateral relative movement therebetween, each of said tubular leg-connecting crosspieces having leg-receiving openings whose axes are inclined with respect to the associated leg elements in a vertical direction, the defining walls of said leg-receiving openings making locking engagement with the relatively inclined leg elements which may slidably pass through said openings when the respective axes of the leg-receiving openings and the leg elements are generally parallel, and a pair of tie rods having substantially straight shanks for bracing the respective pairs of leg elements against longitudinal movement relative to said crossbar, said tie rods each having a hook at one end, each of said tubular leg-connecting crosspieces having a hook-receiving hole formed in the middle portion thereof spaced on one side of a line extending between the centers of the leg-receiving openings thereof so as to face upwardly toward the center portion of the crossbar, the hooked end of each of said tie rods passing through the hook-receiving hole of the associated tubular leg-connecting crosspiece where the hook is located completely within the space therein in a plane extending longitudinally of the crosspiece, the hook having a length comparable to the size of the inside of the associated tubular crosspiece so that the hook fits inside the crosspiece with only a small amount of play and is removable therefrom by twisting the tie rod so that the hook faces downwardly where it can be removed from said hook-receiving hole.

2. In a knockdown saw horse assembly or the like including a crossbar and a first and a second pair of leg elements connected to opposite ends of said crossbar for supporting said crossbar in an elevated position, a pair of tubular leg-connecting cross pieces secured between the leg elements of each pair of leg elements for preventing lateral relative movement therebetween, each of said tubular leg-connecting crosspieces having leg-receiving openings whose axes are inclined with respect to the associated leg elements in a vertical direction, the defining walls of said leg-receiving openings making locking engagement with the relatively inclined leg elements which may slidably pass through said openings when the respective axes of the leg-receiving openings and the leg elements are generally parallel, a pair of tie rods having substantially straight shanks for bracing the respective pairs of leg elements against longitudinal movement relative to said crossbar, said tie rods each having a hook at one end in the plane of the associated tie rod and a fastener-receiving eye at the other end in a plane including the tie rod shank which plane is at right angles to the plane of the hook at the other end, each of said tubular leg-connecting crosspieces having a hook-receiving hole formed in the middle portion thereof spaced on one side of a line extending between the centers of the leg-receiving openings thereof so as to face upwardly toward the center portion of the crossbar, the hooked end of each of said tie rods passing through the hook-receiving hole of the associated tubular leg-connecting crosspiece where the hook is located completely within the space therein in a plane extending longitudinally of the crosspiece, the hook having a length comparable to the size of the inside of the associated tubular crosspiece so that the hook fits inside the crosspiece with only a small amount of play and is removable therefrom by twisting the tie rod so that the hook end faces downwardly where it can be removed from said hook-receiving hole, and fastener means passing through the eyes of the upper end of said tie rods for removably securing the tie rods thereto.

3. In a compact assembly of separate elements which can be assembled into a saw horse or the like, said assembly including a main supporting crossbar, first and second pairs of tubular leg elements respectively to be connected to the opposite ends of said crossbar for supporting the same in an elevated position, and a pair of releasable fastener means for removably securing said pairs of leg elements to the ends of said crossbar, the improvement comprising a pair of tubular leg-connecting crosspieces to be connected between said first and second pair of leg elements for inhibiting relative lateral movement therebetween, and a pair of tie rods for bracing the respective pairs of leg elements against longitudinal movement relative to said crossbar, said tie rods each having a hook at one end, each of said tubular leg-connecting crosspieces having a hook-receiving hole, the hook-receiving hole of each tubular leg-connecting crosspiece being sized to receive the end of the hook of the associated tie rod, the size of the hook of each tie rod being comparable to the size of the inside of the associated tubular crosspiece wherein the hooked end can be fully inserted into the tubular crosspiece with only a small amount of play therebetween by insertion of the end of the hook while it faces downwardly into the latter hook-receiving hole, and then twisting the tie rod so that the tie rod inclines upwardly, and releasable fastener means for removably securing the tie rods to said crossbar.

4. In a knockdown assembly of elements including a crossbar and a pair of leg elements connected to the crossbar, the improvement comprising a leg-connecting crosspiece connected between said leg elements inhibiting relative lateral movement therebetween, said leg-connecting crosspiece having flat ends in which are formed leg-receiving openings which can respectively slidably receive the associated leg elements when the latter extends parallel to the axes of the leg-receiving openings and the defining walls of which make locking engagement with the leg-elements when the latter are inclined a given amount to said holes axes, and a tie rod for bracing the leg elements against longitudinal movement relative to said crossbar, said tie rod having a substantially straight shank having a hook at one end in a plane including the shank thereof and a fastener-receiving eye at the other end formed in a plane including the tie rod shank and at right angles to the plane of the hook at the other end, the end of said hook extending generally longitudinally of the tie rod shank, said leg-connecting crosspiece having a hook-receiving hole formed in the middle portion thereof and spaced on one side of a line extending between the centers of the leg-receiving opening thereof, so as to face upwardly toward the center portion of the crossbar when assembled to the associated leg elements, the hook-receiving hole of said leg-connecting crosspiece being sized to receive the end of the hook of the associated tie rod, the size of the hook of the tie rod being comparable to the size of the inside of the associated tubular crosspiece wherein the hooked end can be fully inserted into the tubular crosspiece with only a small amount of play therebetween, by insertion of the end of the hook while it faces facing downwardly into the latter hook-receiving hole, and then twisting the tie rod so that it inclines upwardly, and releasable fastener means adapted to pass through said eye at the ends of said tie rod and center portion of said crossbar for removably securing the tie rod to said crossbar.

References Cited in the file of this patent
UNITED STATES PATENTS

| | | |
|---|---|---|
| 302,945 | Sargent | Aug. 5, 1884 |
| 840,360 | Normand | Jan. 1, 1907 |
| 933,650 | Kramer | Sept. 7, 1909 |
| 1,471,223 | Tomlinson | Oct. 16, 1923 |
| 1,603,233 | Conwell | Oct. 12, 1926 |
| 1,936,196 | Kacena | Nov. 21, 1933 |
| 2,198,956 | Thieleappe | Apr. 30, 1940 |
| 2,594,464 | Loucks | Apr. 29, 1952 |